(12) United States Patent
Kazama et al.

(10) Patent No.: US 9,429,951 B2
(45) Date of Patent: Aug. 30, 2016

(54) TRANSPORT MANAGEMENT APPARATUS, TRANSPORT SYSTEM, AND TRANSPORT MANAGEMENT PROGRAM

(71) Applicant: Hitachi, Ltd., Chiyoda-ku, Tokyo (JP)

(72) Inventors: Yoriko Kazama, Tokyo (JP); Junichi Kimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/418,718

(22) PCT Filed: Oct. 21, 2013

(86) PCT No.: PCT/JP2013/078418
§ 371 (c)(1),
(2) Date: Jan. 30, 2015

(87) PCT Pub. No.: WO2015/059739
PCT Pub. Date: Apr. 30, 2015

(65) Prior Publication Data
US 2016/0026186 A1    Jan. 28, 2016

(51) Int. Cl.
*G05D 1/00*    (2006.01)
*B65G 1/00*    (2006.01)
*G05D 1/02*    (2006.01)
*B65G 1/137*    (2006.01)
*B65G 1/10*    (2006.01)

(52) U.S. Cl.
CPC ............ *G05D 1/0287* (2013.01); *B65G 1/137* (2013.01); *G05D 1/0274* (2013.01); *G05D 1/0297* (2013.01); *B65G 1/10* (2013.01); *B65G 1/1378* (2013.01); *G05D 2201/0216* (2013.01)

(58) Field of Classification Search
USPC .......................................... 701/24; 414/284
See application file for complete search history.

(56) References Cited

U.S. PATENT DOCUMENTS

| 6,652,213 | B1* | 11/2003 | Mitchell | B65G 1/0492 414/279 |
| 2003/0093176 | A1 | 5/2003 | Ohtsuka et al. | |
| 2003/0149509 | A1 | 8/2003 | Udou et al. | |
| 2012/0029685 | A1* | 2/2012 | Keller | G06Q 10/087 700/216 |
| 2013/0000438 | A1* | 1/2013 | Ouellet | B25J 5/007 74/490.03 |
| 2013/0238117 | A1* | 9/2013 | Yagawa | G05B 19/41895 700/228 |

(Continued)

FOREIGN PATENT DOCUMENTS

JP    4-310107 A    11/1992
JP    5-265535 A    10/1993

(Continued)

*Primary Examiner* — Thomas G Black
*Assistant Examiner* — Tyler Paige
(74) *Attorney, Agent, or Firm* — Crowell & Moring LLP

(57) ABSTRACT

A controller (1) includes: a transfer area setting unit (11) which, when transferring a transported object from a transfer source vehicle of respective transport vehicles to a transfer destination vehicle of the respective transport vehicles, decides a transfer area at a destination to which the transported object is transported by the transfer source vehicle; a transfer vehicle setting unit (12) which decides the transport vehicle that is the transfer destination vehicle on the basis of position information of the transfer area and the position information of the respective transport vehicles; and an instruction unit (14) which instructs the transfer source vehicle to carry out a task of transporting the transported object to the transfer area, and instructs the transfer destination vehicle to carry out a task of transporting the transported object from the transfer area.

12 Claims, 16 Drawing Sheets

(56) References Cited

U.S. PATENT DOCUMENTS

2013/0317642 A1* 11/2013 Asaria .................... G06Q 50/28
                                                                                                                          700/216
2014/0046512 A1* 2/2014 Villamar .............. G05D 1/0212
                                                                                                                          701/19

FOREIGN PATENT DOCUMENTS

| JP | 9-325815 A | 12/1997 |
| JP | 2007-45287 A | 2/2007 |
| WO | WO 2011/158308 A1 | 12/2011 |

* cited by examiner (a)

(b)

(c)

(a)

(b)

(c)

(a)

(b)

(c)

(a)

(b)

(a)

(b)

(c)

(d)

(e)

(f)

(a)

(b)

(c)

(d)

(e)

(f)

(a)

(b)

(c)

(d)

(e)

(f)

(a)

(b)

(c)

(d)

(e)

(f)

(a)

(b)

TRANSPORT MANAGEMENT APPARATUS, TRANSPORT SYSTEM, AND TRANSPORT MANAGEMENT PROGRAM

TECHNICAL FIELD

The present invention relates to a transport management system, a transport system, and a transport management program.

BACKGROUND ART

PTL 1 discloses that when a plurality of robots is carrying out line work, the work of a malfunctioning robot is transferred to a non-malfunctioning robot in order to assist the malfunctioning robot. In this system, the malfunctioning robot is disconnected from the system and the content of the work of the non-malfunctioning robot is changed, thereby realizing the transfer.

CITATION LIST

Patent Literature

PTL 1: JP-A-05-265535

SUMMARY OF INVENTION

Technical Problem

By the way, in a warehouse, a number of stored products are housed in individual racks. In order to pick a predetermined stored product from a warehouse, there is a technique in which a database of the positions of stored products in the warehouse is created and the database is searched to find and display the housing position of a stored product to be picked, thus giving a picking instruction.

Moreover, instead of having an operator directly move to the position of the stored product that is found, configuration is conceivable in which a transport vehicle is made to carry the whole rack housing the stored product that is found, to an operator waiting at a predetermined position, and in which the transport vehicle is controlled in such a way that the operator can pick the stored product from the rack at the predetermined position.

Here, while a transport vehicle is carrying a predetermined rack toward a destination, there may be a circumstance where the carrying to the destination is difficult. For example, as the remaining battery capacity of a transport vehicle decreases, battery rundown may occur during the carrying. In such a circumstance, the need to transfer the task of carrying the rack from a transport vehicle to another transport vehicle arises.

In the transfer assistance described in PTL 1, since the installation position (arrangement) of each robot is fixed in advance by the line, which work of which robot should be transferred to which robot is obvious.

However, in the carrying system using transport vehicles, a plurality of transport vehicles constantly move and not only the transport vehicles but also the positions of racks or the like change dynamically. Therefore, the transfer assistance system on the assumption that the positions are fixed, described in PTL 1, cannot be applied.

Thus, the principal object of the invention is to realize the transfer between transport vehicles in the carrying system using transport vehicles.

Solution to Problem

In order to solve the foregoing problem, a transport management apparatus according to the invention includes:

a receiving unit which receives position information of respective transport vehicles transporting a transported object and stores the position information of the respective transport vehicles that is received, in a storage unit;

a transfer area setting unit which, when transferring the transported object from a transfer source vehicle of the respective transport vehicles to a transfer destination vehicle of the respective transport vehicles, decides a transfer area at a destination to which the transported object is transported by the transfer source vehicle;

a transfer vehicle setting unit which decides the transport vehicle that is the transfer destination vehicle on the basis of position information of the transfer area and the position information of the respective transport vehicles; and an instruction unit which instructs the transfer source vehicle to carry out a task of transporting the transported object to the transfer area, and instructs the transfer destination vehicle to carry out a task of transporting the transported object from the transfer area.

Other measures will be described later.

Advantageous Effect of Invention

According to the invention, the transfer between transport vehicles can be realized in the carrying system using transport vehicles.

BRIEF DESCRIPTION OF DRAWINGS

FIG. 2(a) shows the rack. FIG. 2(b) shows the transport vehicle. FIG. 2(c) shows the state where the transport vehicle lifts up the rack.

FIG. 3(a) shows a collection notification for the rack. FIG. 3(b) shows the transport vehicle which gets under the rack. FIG. 3(c) shows the state where the transport vehicle lifts up the rack.

FIG. 4(a) shows a movement to the transfer area. FIG. 4(b) shows the state where the rack is unloaded in the transfer area. FIG. 4(c) shows picking work.

FIG. 5(a) shows a completion notification for the picking work. FIG. 5(b) shows the state where the transport vehicle is charged at a charging station.

FIG. 12(a) shows a descent start instruction for a forklift. FIG. 12(b) shows a descent completion instruction.

FIG. 16(a) shows an example of a route with a large number of transfer areas. FIG. 16(b) shows an example of a route with a small number of transfer areas.

DESCRIPTION OF EMBODIMENTS

Hereinafter, an embodiment of the invention will be described in detail with reference to the drawings.

Figure 1:
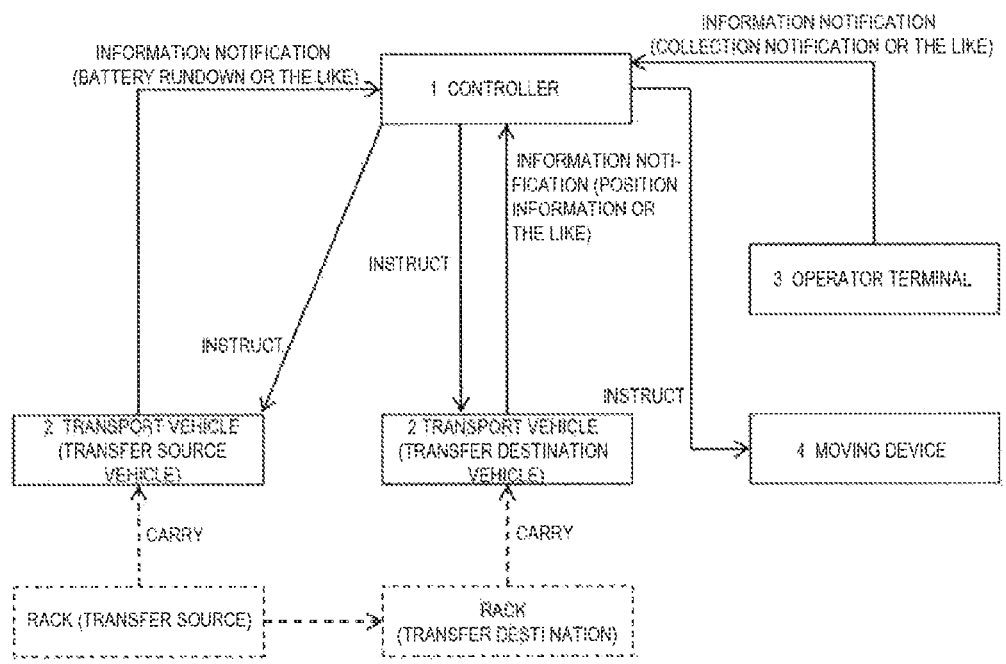
FIG. 1 is a configuration view showing a transport system according to one embodiment of the invention.

FIG. 1 is a configuration view showing a transport system.

A controller 1 gives an instruction (task) to transport vehicles 2. The task may be, for example, to carry a rack, move to a destination, or the like. Also, a plurality of racks is installed in a warehouse and products are housed in the respective racks.

The transport vehicles 2 execute the task given by the controller 1. A rack involved in the task is transferred between two transport vehicles 2 (from a transfer source vehicle to a transfer destination vehicle). That is, the rack carried by a transport vehicle (transfer source vehicle) 2 is put in a transfer area, and subsequently a transport vehicle (transfer destination vehicle) 2 carries the rack.

Here, the "transfer area" refers to a place where a transport vehicle temporarily puts the rack it is carrying, for the purpose of having another transport vehicle carry the rack subsequently. The transfer area is designated in advance with coordinates on a map. Also, a rack-installable area where a rack is scheduled to be installed may be set as a transfer area. In that case, the rack carried by a transport vehicle (transfer source vehicle) is installed in the transfer area, which is a rack installation area, and a transport vehicle (transfer destination vehicle) carries the rack.

Each transport vehicle 2 notifies the controller 1 of various kinds of information. For example, a transport vehicle (transfer source vehicle) 2 notifies the controller 1 of its own battery rundown. The controller 1, having received the notification, gives an instruction that the rack carried by the transport vehicle (transfer source vehicle) 2 is to be transferred to another transport vehicle (transfer destination vehicle) 2.

Therefore, each transport vehicle 2 constantly notifies the controller 1 of its own position information and thereby provides a clue for the controller 1 to decide which transport vehicle 2 the transfer should be made to (for example, to decide the nearest transport vehicle (transfer destination vehicle) to the transport vehicle (transfer source vehicle) 2, or the like).

An operator terminal 3 is a terminal operated by an operator. The operator carries out various kinds of work on racks. This work is, for example, work of picking a stored product that is stored on a rack (take out from a rack). Therefore, the operator terminal 3 notifies the controller 1 of necessary information for the work (for example, a collection notification that a rack should be carried near the operator).

A moving device 4 is a device which moves a rack from a point to another point. In terms of carrying a rack, the transport vehicles 2 and the moving device 4 have a common feature. Meanwhile, the transport vehicles 2 are vehicles and therefore are limited to planar movements. If a movement that cannot be made by the transport vehicles 2 (for example, a movement in the direction of height) is to be made, the moving device 4 takes charge of the movement. The moving device 4 may be configured as a mechanical movement device such as a forklift, lift, or elevator, or may be configured with a movement of a truck operated by the operator or a grasp by the operator him/herself.

In this case, the rack is moved from a transfer area to another transfer area by the mechanical moving device. The transport vehicle receives the rack in the transfer area.

The controller 1 transmits an instruction about the movement (for example, an ascent instruction or descent instruction for the forklift) to the moving device 4.

Figure 2:
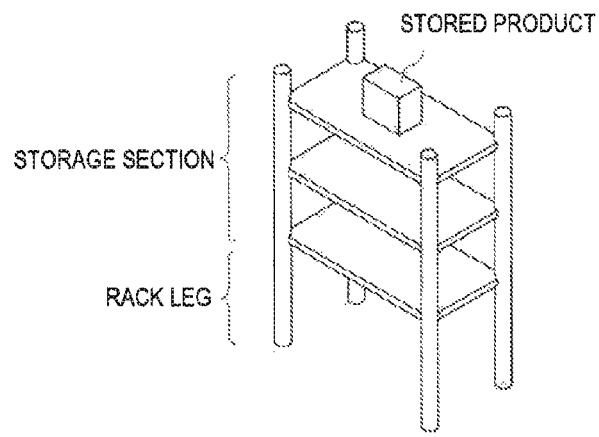
FIG. 2 is an elevation view showing a rack and a transport vehicle according to the one embodiment of the invention.
Figure 2:
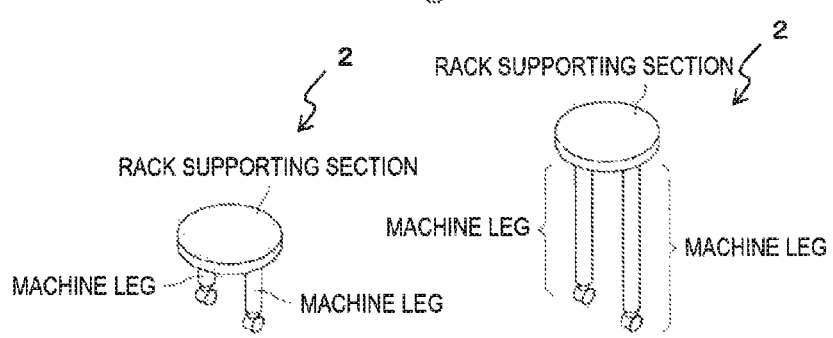
Figure 2:
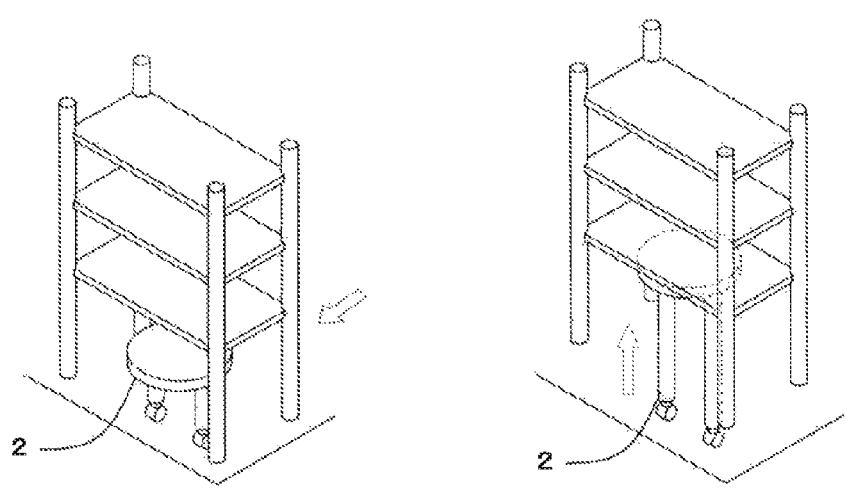

FIG. 2 is an elevation view showing a rack and a transport vehicle.

In the rack shown in FIG. 2(a), a product (stored product) to be picked is housed in a storage section in an upper part of the rack. In a lower part of the rack, four rack legs for supporting the rack are arranged.

The transport vehicle 2 shown in FIG. 2(b) is provided with a rack supporting section for lifting up the rack, and machine legs with wheels for travelling with the rack. The machine legs (or the rack supporting section) of the transport vehicle 2 can expand and contract in vertical directions in order to carry the rack.

As shown in FIG. 2(c), the transport vehicle 2 can get under the storage section of the rack. As the machine legs of the transport vehicle 2 expand upward, the rack supporting section pushes up the storage section of the rack. By moving in this push-up state, the transport vehicle 2 can carry the rack. Also, the transport vehicle 2 rotates both in the state where the rack is lifted up and in the state where the rack is not lifted up. Therefore, the transport vehicle 2 can turn at a point of intersection.

Figure 3:
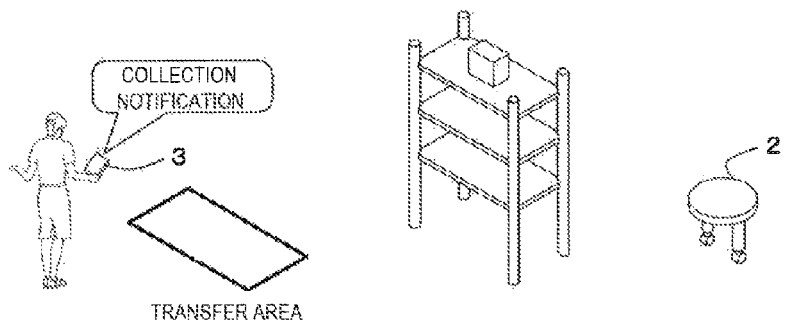
FIG. 3 is an elevation view showing a rack carrying process to a transfer area according to the one embodiment of the invention.
Figure 3:
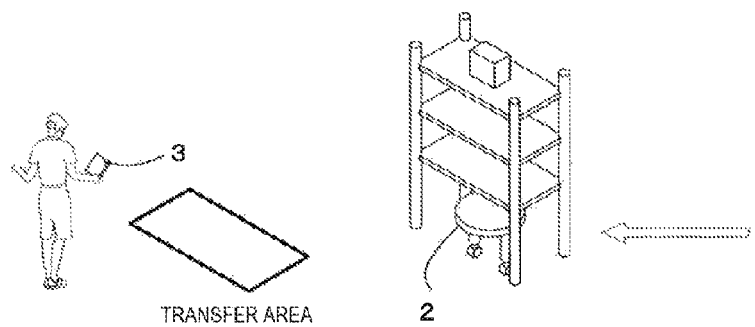
Figure 3:
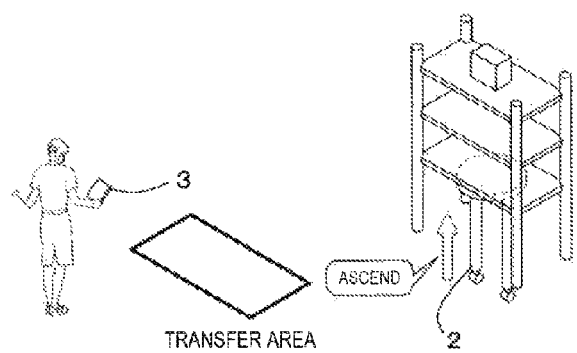

FIG. 3 is an elevation view showing a rack carrying process to a transfer area.

In FIG. 3(a), the operator near the transfer area transmits a collection notification for the rack to the controller 1 via the operator terminal 3 in order to carry out new work (picking). In a rack that is a work target, a stored product that is a picking target is stored. A transport vehicle (transfer source vehicle) 2 exists near the rack of the work target.

In FIG. 3(b), a task of carrying the rack of the work target is assigned to the transport vehicle (transfer source vehicle) 2 by the controller 1. The transport vehicle (transfer source vehicle) 2 gets under the rack of the work target in order to carry the rack as shown in FIG. 2.

In FIG. 3(c), the transport vehicle (transfer source vehicle) 2 under the rack causes the machine legs to ascend and thus lifts up the rack of the work target.

Figure 4:
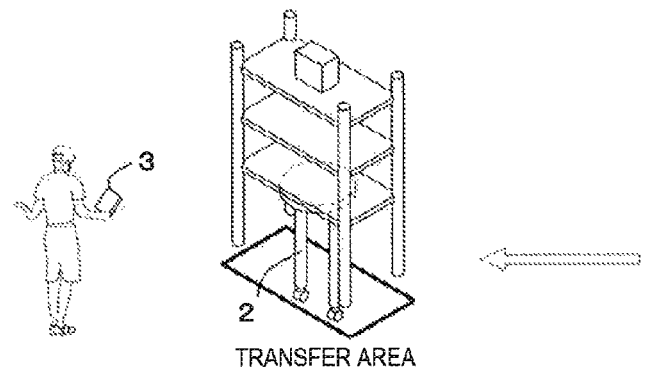
FIG. 4 is an elevation view showing a picking process in the transfer area according to the one embodiment of the invention.
Figure 4:
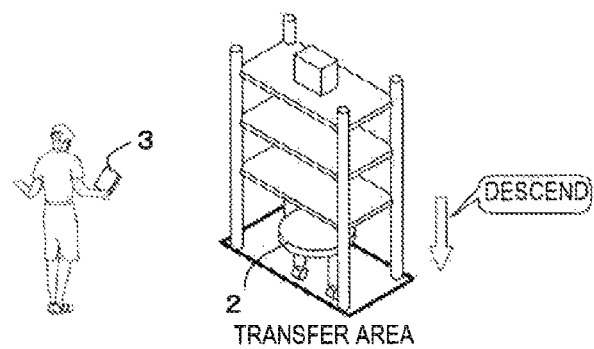
Figure 4:
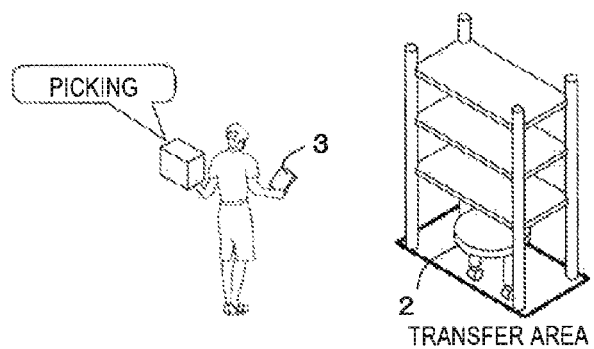

FIG. 4 is an elevation view showing a picking process in the transfer area.

In FIG. 4(a), following FIG. 3(c), the transport vehicle (transfer source vehicle) 2 moves to the transfer area in the state of lifting up the rack of the work target.

In FIG. 4(b), the transport vehicle (transfer source vehicle) 2 causes the machine legs to descend and thereby unloads the rack of the work target in the transfer area. Thus, the operator can reach the rack of the work target with the hands.

In FIG. 4(c), the operator carries out picking from the rack of the work target and thereby carries out shipping work of the product. As separate work from the picking, the operator may house the product in the rack and thereby carry out receiving work of the product, or may confirm the number of products and thereby carry out stocktaking work.

Figure 5:
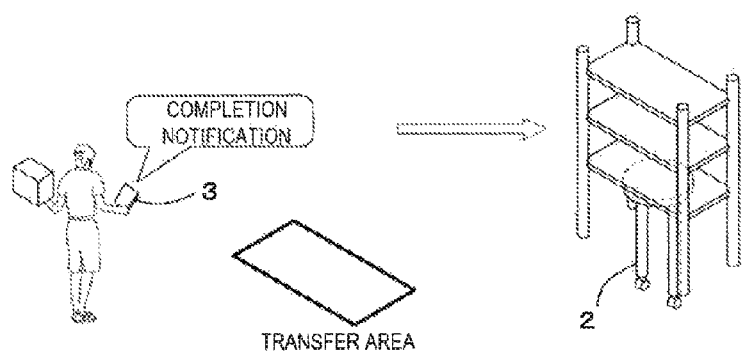
FIG. 5 is an elevation view showing the rack carrying process after the picking process, and a charging process for the transport vehicle according to the one embodiment of the invention.
Figure 5:
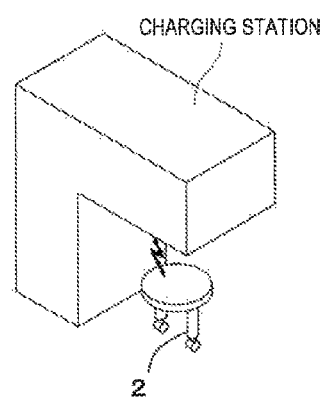

FIG. 5 is an elevation view showing the rack carrying process after the picking process, and a charging process for the transport vehicle.

In FIG. 5(a), following FIG. 4(c), the operator transmits a notification that the work is complete, to the controller 1. The controller 1, having received the notification, instructs a transport vehicle (transfer destination vehicle) 2 near the transfer area to carry out a task of carrying the rack from the transfer area. The transport vehicle (transfer destination vehicle) 2 carries the rack from the transfer area according to the instruction.

Also, the controller 1 may cause the transport vehicle (transfer destination vehicle) 2 in FIG. 5(a) to move toward the transfer area before the transport vehicle (transfer source vehicle) 2 installs the rack in the transfer area in FIG. 4(b), or may cause the transport vehicle (transfer destination vehicle) 2 to move to the transfer area after the rack is installed.

FIG. 5(b) shows that the transport vehicle 2 is charged on its own at a charging station. The controller 1 instructs a transport vehicle 2 with a low remaining battery capacity to carry out a task of moving to the charging station and start charging.

Figure 6:
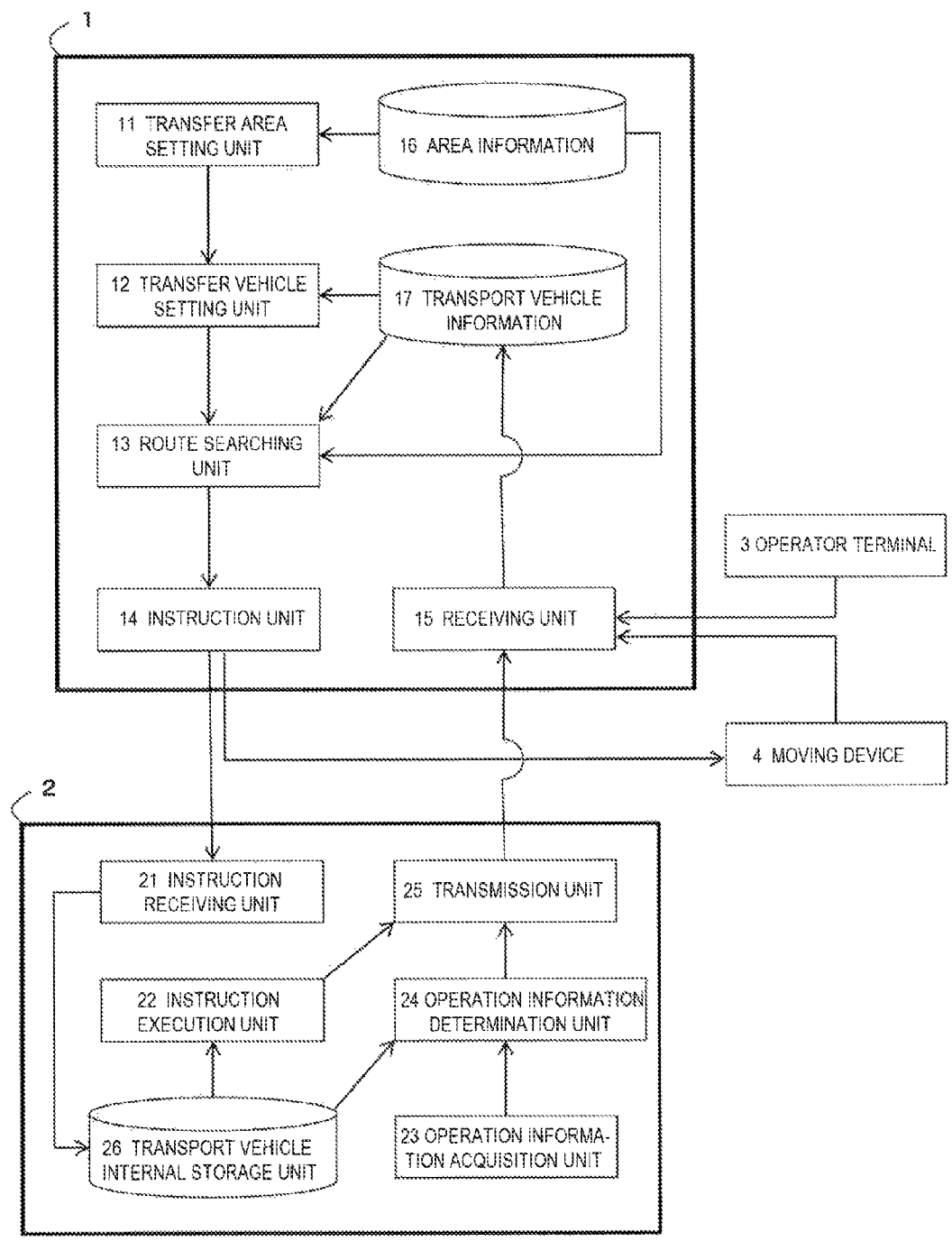
FIG. 6 is a configuration view showing details of devices in a transport system according to the one embodiment of the invention.

FIG. 6 is a configuration view showing details of devices in the transport system.

The controller 1 is configured, including a transfer area setting unit 11, a transfer vehicle setting unit 12, a route searching unit 13, an instruction unit 14, a receiving unit 15, and a storage unit (which stores area information 16 and transport vehicle information 17).

The controller 1 is configured as a computer having a CPU (central processing unit), a memory, a hard disk (storage unit), and a network interface. This computer causes each processing unit to operate as the CPU executes a program read onto a memory.

The transport vehicle 2 is configured, including an instruction receiving unit 21, an instruction execution unit 22, an operation information acquisition unit 23, an operation information determination unit 24, a transmission unit 25, and a transport vehicle internal storage unit 26.

The transfer area setting unit 11 sets a transfer area on the basis of a rack installation area (area where a rack can be placed, the above-described rack-installable area) defined in advance by the area information 16.

For example, the transfer area setting unit 11 sets the nearest rack installation area (area where a rack can be placed) to the current transport vehicle (transfer source vehicle) 2, as a transfer area. Here, the distance between the positions of two points may be the Euclidean distance or may be the length of the route between two points found by the route searching unit 13. When a rack installation area is not set on a map, the position where an emergency charging notification is issued or an end of an area near the device itself may be set as a transfer area.

In this way, the transfer area setting unit 11 selects a transfer area from the rack installation area or the like and thus can prevent the rack from being placed in a passage that is not the rack installation area, and can prevent the rack in the passage from obstructing the travelling of another transport vehicle 2.

The transfer vehicle setting unit 12 decides a transport vehicle (transfer destination vehicle) 2 scheduled to take over the rack placed in the transfer area. For example, the transfer vehicle setting unit 12 acquires a set of transport vehicles 2 that are not executing a task, or if all the transport vehicles 2 are executing a task, a set of transport vehicles 2 scheduled to end a task at the earliest time from now, from the transport vehicle information 17, and sets a transport vehicle 2 that is not the transport vehicle (transfer source vehicle) 2 in that set and that is nearest to the transfer area, as a transfer destination vehicle.

The route searching unit 13 executes search for a route from the departure point to the destination, using an algorithm of a shortest route search method or the like, on the basis of the position information of the transfer area and the charging station communicated from the transfer area setting unit 11 and the position information of each transport vehicle 2 communicated from the transfer vehicle setting unit 12. Hereinafter, the content of the notification of the departure point and the destination is illustrated.

Departure point "current position of transport vehicle (transfer source vehicle) 2"→Destination "transfer area"

Departure point "transfer area"→Destination "charging station"

Also, instead of searching for the positions of two points (departure point→destination) the positions of three or more points (departure point→first relay point→second relay point→ . . . →destination) may be searched for together.

Departure point "current position of transport vehicle (transfer source vehicle) 2"→Relay point "transfer area"→Destination "charging station"

Here, the relay point refers to a point used as a relay point, of predetermined transfer areas.

The instruction unit 14 instructs the transport vehicle 2 and the moving device 4 to carry out various tasks such as a task designated from the route searching unit 13 (task of travelling the route from the departure point to the destination) and a task designated from the transfer area setting unit 11 (putting the rack in the transfer area, lifting up the rack in the transfer area, or the like). The following are examples of such tasks.

Task of lowering and putting the rack that is moved, in the transfer area, when the transport vehicle (transfer source vehicle) 2 arrives at the transfer area.

Task of carrying the rack of the transfer target to the target area when the transport vehicle (transfer destination vehicle) 2 arrives at the transfer area.

Starting the charging of the transport vehicle (transfer source vehicle) 2 when the transport vehicle (transfer source vehicle) 2 arrives at the charging station.

The transmission unit 25 transmits each piece of information about the device itself acquired by the operation information acquisition unit 23, to the receiving unit 15 of the controller 1 via the transmission unit 25. Also, the communication measure between the transmission unit 25 and the receiving unit 15 may be wireless communication or wired communication.

The receiving unit 15 stores the each piece of information that is received, into the area information 16 and the transport vehicle information 17.

The area information 16 is map information of the warehouse or the like where the transport vehicle 2 and the rack exist, and the positions of various facilities such as the charging station and the moving device 4 are stored therein, in addition to structure information (topographic information) of the building. As this area information 16, the system manager or the like may write prepared data from outside in advance.

The transport vehicle information 17 is information that associates the information acquired by the operation information acquisition unit 23, with the information that an obstacle is determined by the operation information determination unit 24, for each transport vehicle 2 of the information sender.

The instruction receiving unit 21 receives the task designated from the instruction unit 14 and notifies the instruction execution unit 22.

The instruction execution unit 22 executes the task from the instruction receiving unit 21.

The operation information acquisition unit 23 acquires each piece of information about the device itself, as illustrated below, State information that the transport vehicle 2 is moving straight ahead, rotating, standing by, or being charged. If the transport vehicle is being charged, the time when the charging is started and the time when the charging is schedule to end, as additional information.

State related to the instruction, such as whether the transport vehicle is holding the rack or not.

The device's own current position in the map (coordinate values or node number associated with the coordinate values).

Information that an obstacle (shield that obstructs the travelling) is detected in the device's own surroundings, as emergency information.

State that emergency charging is required, as emergency information. This state is issued when the present voltage state of the battery is determined as being equal to or below a threshold value that is set as a low voltage.

Here, the map in terms of the position in the map is expressed as an XY coordinate system. A position is designated by XY coordinates. Also, an XYZ coordinate system including information of floors may be used. The following are methods for acquiring the device's own position in the map.

Read and recognize a marker or the like attached to the floor surface.

Acquire the peripheral circumstance via a camera or sensor, to estimate the device's own position.

Estimate the device's own position from the device's own image picked up by a camera or the like installed on the wall surface, ceiling or the like.

Integrate the device's moving trajectories by odometry or the like, to estimate the current position.

As the operation information acquisition unit 23 acquires information of obstacle detection from an infrared sensor, the operation information acquisition unit 23 transmits information that an obstacle is detected, to the operation information determination unit 24.

The operation information determination unit 24 determines whether the detected sensor information actually relates to an obstacle or not, on the basis of the sensor detection information and the operation information of the transport vehicle received from the operation information acquisition unit 23 and the information of various transport vehicles and racks received from the transport vehicle internal storage unit 26.

If the operation information determination unit 24 determines that an obstacle is detected, the transmission unit 25 sends information of obstacle detection to the controller 1. The position where an obstacle is detected may also be communicated. Also, the instruction execution unit 22 may be notified and instructed to carry out an operation to stop the transport vehicle, or the like.

In the transport vehicle internal storage unit 26, information such as rotation speed information of the transport vehicle, the size of the transport vehicle, the size of the rack, the number of rack legs, and the arrangement of the rack legs is stored.

Moreover, in the transport vehicle internal storage unit 26, map information of the warehouse (the same information as the area information 16) is stored. This map information includes basic information of the map made up of nodes and links.

Figure 7:
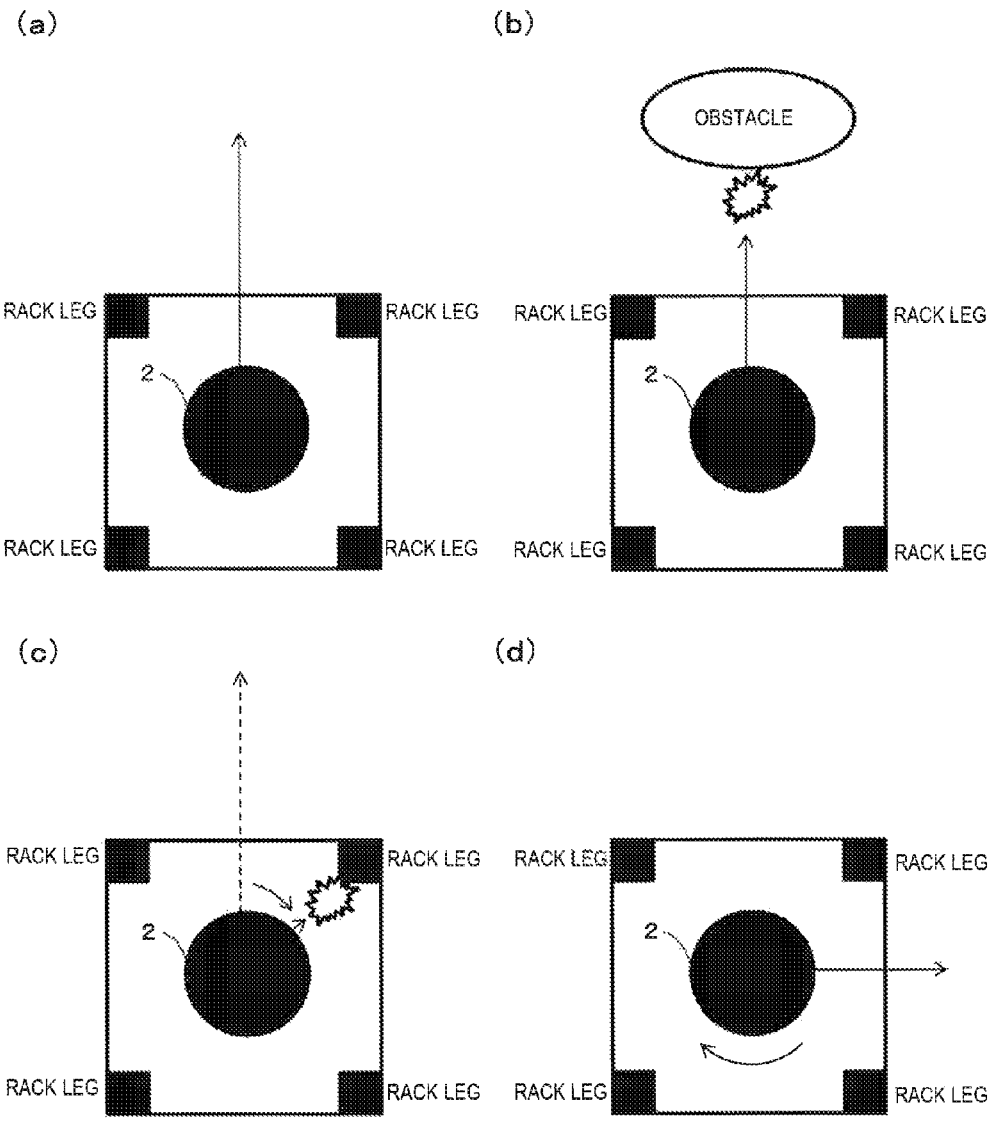
FIG. 7 is a plan view showing an obstacle detection process of the transport vehicle according to the one embodiment of the invention. Time passes in order of (a), (b), (c), and (d).

FIG. 7 is a plan view showing an obstacle detection process of the transport vehicle. As an infrared ray (FIG. 7(a)) radiated forward from the infrared sensor installed in the transport vehicle 2 is interrupted by an obstacle (FIG. 7(b)), the obstacle is detected. Other measures for detecting an obstacle may be image recognition based on a pickup image from a camera, a sensor that is sensitive to other wavelength ranges, and a detection sensor for sound waves.

As described below, the operation of the infrared sensor (on-off control of the infrared sensor, and whether an object detected when the infrared sensor is on should be regarded as an obstacle or not) is set according to the operating state of the transport vehicle 2.

The operating state of the transport vehicle may be the following states.

A "rack holding state" is a state where the transport vehicle 2 is holding a rack. The "hold" here means that the transport vehicle 2 exists below the rack of the moving target. The transport vehicle 2 may be lifting up or lowering the rack of the moving target.

A "no rack state" is a state that is not the "rack holding state".

A "rotating state" is a state where the transport vehicle 2 is rotating (revolving) by itself. FIG. 7(c) shows an example in which a rack leg of the rack carried by the transport vehicle 2 is mistakenly detected as an obstacle with an infrared ray during the rotation of the transport vehicle 2.

A "non-rotating state" is a state that is not the "rotating state". For example, after rotating from upward in FIG. 7(a) to rightward in FIG. 7(d), the transport vehicle 2 shifts to the "non-rotating state".

A "rotating with rack state" is a state where the transport vehicle 2 is lifting up the rack of the moving target, in the "rotating state".

A "straight travelling state" is a state where the transport vehicle 2 is traveling straight ahead.

A "standstill state" is a state where the transport vehicle 2 is standing still.

The state of infrared rays may be the following states.

An "infrared on state" is a state where the operation information acquisition unit 23 keeps the infrared sensor on.

An "infrared off state" is a state that is not the "infrared on state".

An "infrared detecting state" is a state where a certain object is detected at the tip of the transmitted infrared ray, in the "infrared on state".

An "infrared non-detecting state" is a state that is not the "infrared detecting state", in the "infrared on state".

Based on the above-described operating states of the transport vehicle and the states of infrared rays, the obstacle detection process and notification process are carried out, as described below. When a certain state corresponds to both of two contradicting states (for example, the "infrared on state" and the "infrared off state"), the state with the greater number of conditional states (in other words, the state with stricter conditions) employed preferentially (so-called longest match algorithm).

The transport vehicle 2 starts the "infrared on state" in one of the cases below.

The "no rack state"

The "straight travelling state"

The "standstill state"

The "rack holding state" and the "non-rotating state"

The "rack holding state" and the "rotating state" and a "rotation angle at which a rack leg is not detected". Here, the "rotation angle at which a rack leg is not detected" is calculated from the position information of the rack legs and the angle of rotation. For example, if the rotation start angle is 0 degrees and the rotation end angle is 90 degrees, angles excluding the vicinity of 45 degrees are such angles.

The transport vehicle 2 cancels the "infrared on state" and shifts to the "infrared off state" in the case below.

The "rack holding state" and the "rotating state" (FIG. 7(*c*))

The transport vehicle 2 determines an object detected in the "infrared detecting state" as an obstacle in one of the cases below.

The "rack holding state" and the "rotating state" and the "rotating with rack state"

The "rack holding state" and the "rotating state" and that "another object than a rack leg is detected". Here, whether "a rack leg is detected" (described later) or "another object than a rack leg is detected" is determined on the basis of the position of the rack legs and the rotation speed information of the transport vehicle.

The "no rack state" and the "rotating state"

The "straight travelling state"

The "standstill state

The transport vehicle 2 determines that an object detected in the "infrared detecting state" is not an obstacle, in the case below.

The "rack holding state" and the "rotating state" and that "a rack leg is detected"

Also, the transport vehicle 2 may change not only the state of infrared rays but also the detection range and the detection distance of the infrared sensor according to the operating state of the transport vehicle. For example, if in the "rotating state", the transport vehicle 2 decreases the detection distance of the infrared sensor to shorter than the distance from the sensor position to the rack legs.

Alternatively, if in the "straight travelling state", the transport vehicle 2 increases the detection distance of the sensor. Also, according to the travelling speed in the "straight travelling state", the transport vehicle 2 may set the braking ability to perform control so as not to collide with an obstacle after the obstacle is detected, by increasing the detection distance if the travelling speed is fast, and decreasing the detection distance if the travelling speed is slow, or the like.

Thus, recognition errors by the obstacle detection sensor installed in the transport vehicle 2 can be reduced, and an obstacle can be detected.

Figure 8:
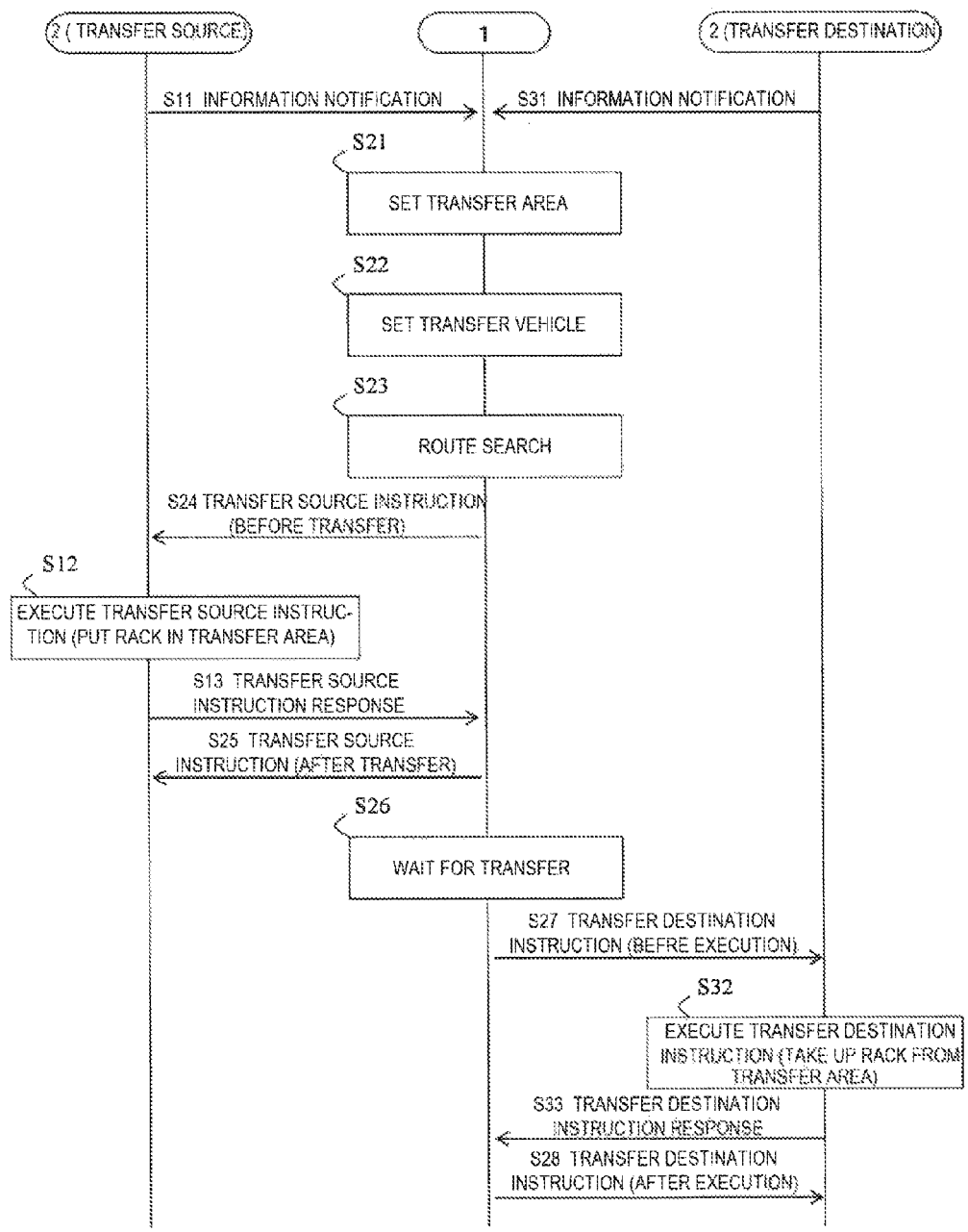
FIG. 8 is a flowchart showing a transport management process of a controller according to the one embodiment of the invention.

FIG. 8 is a flowchart showing a transport management process of the controller.

In S11, the transmission unit 25 of the transport vehicle (transfer source vehicle) 2 notifies the controller 1 of the various kinds of information acquired by the operation information acquisition unit 23 and the information that an obstacle is detected by the operation information determination unit 24. Similarly, in S31, the transport vehicle (transfer destination vehicle) 2 notifies the controller 1 of information.

The notification of information in S11 and S31 is carried out not only once but many times at each predetermined timing. As the predetermined timing, for example, information may be transmitted every predetermined time, or piggybacked on another notification (response in S13, described later, or the like) when this notification is sent from the transport vehicle 2 to the controller 1, or transmitted when emergency information is generated, such as information that an obstacle is detected, or information that a low remaining battery capacity is detected.

In S21, the transfer area setting unit 11 of the controller 1 sets a transfer area on the basis of the information communicated in S11.

In S22, the transfer vehicle setting unit 12 of the controller 1 sets a transport vehicle (transfer destination vehicle) 2 on the basis of the transfer area that is set in S21.

In S23, the route searching unit 13 of the controller 1 searches for a route through which the transport vehicles (transfer source vehicle and transfer destination vehicle) 2 are to move, on the basis of the position of the transfer area that is set in S21 and the position of each transport vehicle 2 such as the transfer destination vehicle that is set in S22.

In S24, the instruction unit 14 of the controller 1 transmits a transfer source instruction about the route decided in S23 (an instruction to be carried out before transfer, of such instructions) to the instruction receiving unit 21 of the transport vehicle (transfer source vehicle) 2.

In S12, the instruction execution, unit 22 of the transport vehicle (transfer source vehicle) 2 receives the instruction of S24 and executes the transfer source instruction. This transfer source instruction is, for example, an instruction that the rack carried by the transport vehicle should be put in the transfer area.

In S13, the transmission unit 25 of the transport vehicle (transfer source vehicle) 2 response to the transfer source instruction, with the result of the execution of S12 (for example, that the rack is put in the transfer area).

In S25, the instruction unit 14 of the controller 1 transmits a transfer source instruction about the route decided in S23 (an instruction to be carried out after transfer, of such instructions) to the instruction receiving unit 21 of the transport vehicle (transfer source vehicle) 2. This transfer source instruction is, for example, a task of moving from the transfer area to the charging station. Meanwhile, when there is no instruction to be carried out after the transfer in S25, the process of S25 may be omitted. Moreover, the instruction unit 14 of the controller 1 may transmit the instruction of S25 together at the point of S24, without waiting for the response in S13.

In S26, the controller 1 waits for transfer in order to start S27, described later. The end timing of this transfer waiting may be when the response in S13 is received, or may be when another notification (for example, the case where the operator terminal 3 communicates the completion of the movement of the rack by the moving device 4) is received in addition to the response in S13 (or instead of the response).

In S27, the instruction unit 14 of the controller 1 transmits a transfer destination instruction about the route decided in S23 (an instruction to be carried out before response in S33, of such instructions) to the instruction receiving unit 21 of the transport vehicle (transfer destination vehicle) that is set in S22.

In S32, the instruction execution unit 22 of the transport vehicle (transfer destination vehicle) 2 executes the transfer destination instruction received in S27. This instruction is, for example, an instruction that the rack put in S12 should be taken up from the transfer area.

In S33, the transmission unit 25 of the transport vehicle (transfer destination vehicle) 2 responds to the controller 1, with the result of the execution in S32 (result of the transfer destination instruction in S27).

In S28, the instruction unit 14 of the controller 1 transmits a transfer destination instruction to be carried out after S27, to the instruction receiving unit 21 of the transport vehicle (transfer destination vehicle) 2 that transmits the response in S33. This instruction is, for example, that the rack should be carried from the transfer area to a target area.

Referring to FIG. 8, the process in which the controller 1 gives instructions to each transport vehicle 2 is described above. Hereinafter, variations of the form of arrangement of the warehouse and the rack will be described, specifically, and specific contents of instructions given to each transport vehicle 2 by the controller 1 in each form will be described in detail.

Figure 9:
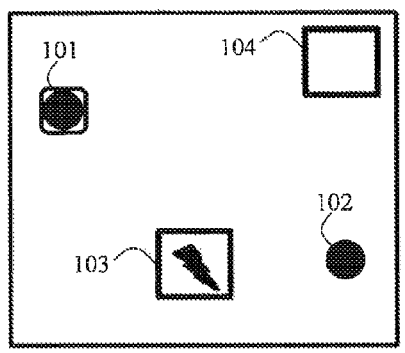
FIG. 9 is a plan view showing the way the transport vehicle is charged, according to the one embodiment of the invention. Time passes in order of (a), (b), (c), (d), (e), and (f).
Figure 9:
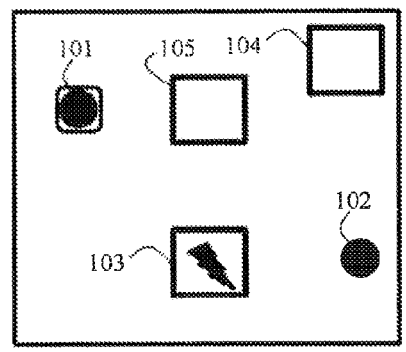
Figure 9:
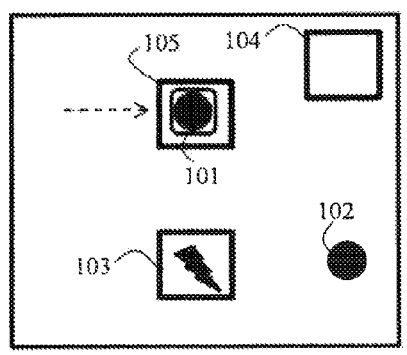
Figure 9:
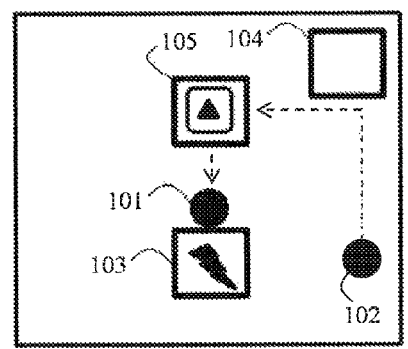
Figure 9:
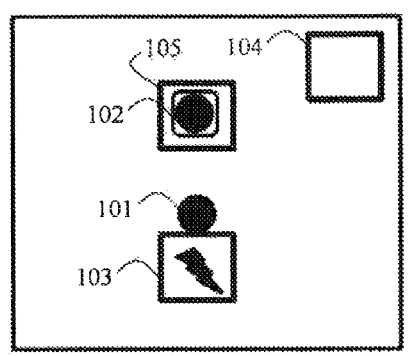
Figure 9:
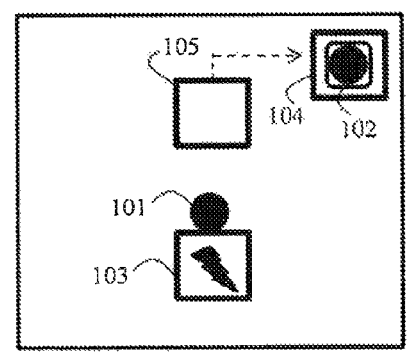

FIG. 9 is a plan view showing the way the transport vehicle is charged. The following plan view is a view in which the warehouse is looked down at, directly below (toward the ground) from the ceiling (in the air).

FIG. 9(a) shows a transport vehicle 101 that is a transport vehicle (transfer source vehicle) 2, a transport vehicle 102 that is a transport vehicle (transfer destination vehicle) a charging station 103, and a target area 104 that is a destination of the rack carried by the transport vehicle 101. Here, it is assumed that a fall in the remaining battery capacity is detected in the transport vehicle 101 during the execution of a task of carrying the rack to the target area 104 (initial task).

In FIG. 9(b), the transfer area setting unit 11 of the controller 1, having received a notification of the fall in the remaining battery capacity, sets a transfer area 105.

Therefore, the transfer area setting unit 11 searches the vacancy status of each charging station and searches the area information 16 for the nearest charging station to the transport vehicle 101, of currently vacant charging stations (available for charging). Alternatively, when there is no charging station that is currently vacant, the transfer area setting unit 11 searches for a charging station that is scheduled to end charging at the earliest time.

Next, the transfer area setting unit 11 sets the transfer area 105 on the basis of the position of the charging station that is found and the current position of the transport vehicle 101.

For example, the transfer area setting unit 11 may set the nearest rack installation area to the current position of the transport vehicle 101, as the transfer area 105.

Alternatively, the transfer area setting unit 11 may cause the route searching unit 13 to search for a route from the current position of the transport vehicle 101 to the position of the charging station that is found, and set a rack installation area situated on the resulting route for near the route) as the transfer area 105.

The controller 1 transmits, to the transport vehicle 101, a transfer source instruction (S24) that the transport vehicle 101 should move to the transfer area 105 (FIG. 9(c)) and put the rack in the transfer area 105 (FIG. 9(d)). As this transfer source instruction (S24) includes a cancellation instruction for the initial task, there is no need to wait for the completion of charging of the transport vehicle 101.

Meanwhile, in this embodiment, as shown in the transfer area 105 in FIG. 9(d), a rounded square indicating a rack, and a triangle in solid black indicating a stored product inside the rack are shown.

Moreover, the controller 1 transmits, to the transport vehicle 101, a transfer source instruction (S25) that the transport vehicle 101 should move from the transfer area 105 to the charging station and start charging.

The controller 1 transmits, to the transport vehicle 102, a transfer destination instruction (S27) that the transport vehicle 102 should move to the transfer area 105 and take up the rack put in the transfer area 105 (FIG. 9(e)). The controller 1 transmits, to the transport vehicle 102, a transfer destination instruction (S28) that the transport vehicle 102 should carry the rack from the transfer area 105 to the target area 104 (FIG. 9(f)).

As described above, the controller 1 instructs the transport vehicle 101 to carry out the task of moving from the "current position of the transport vehicle 101"→the relay point "transfer area 105"→the destination "charging station 103". The controller 1 instructs the transport vehicle 102 to carry out the task of moving from the "current position of the transport vehicle 102"→the relay point "transfer area 105"→the destination "target area 104". Thus, the transport vehicles 101, 102 can transfer the rack between each other, and a delay in the carrying can be prevented.

Meanwhile, according to the related-art techniques of JP-A-06-282327 and JP-A-2001-92529, mechanisms for starting a charging operation in order to prevent battery rundown, when the battery capacity of a transport vehicle becomes low, are disclosed. However, these related-art techniques only consider the emergency charging of the transport vehicle and do not even suggest that the task carried out by the transport vehicle should be transferred to another transport vehicle. Therefore, unlike the form shown in FIG. 9, according to the related-art techniques, the carrying is interrupted until the charging ends.

Figure 10:
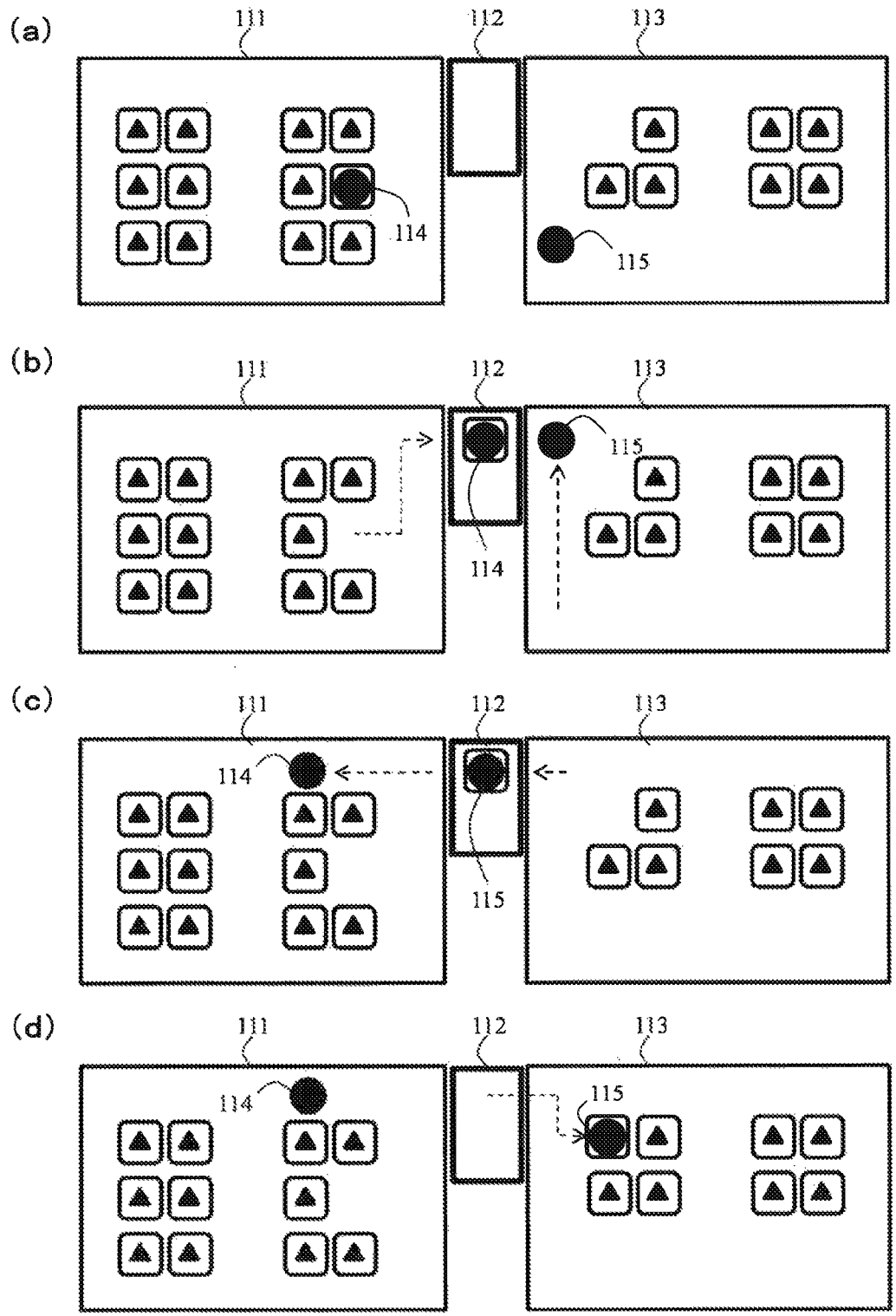
FIG. 10 is a plan view showing the way a rack is transferred between different warehouses, according to the one embodiment of the invention. Time passes in order of (a), (b), (c), and (d).

FIG. 10 is a plan view showing the way a rack is transferred between different warehouses. As shown in FIG. 10(a), a first warehouse 111 and a second warehouse 113 are connected by a passage that is a transfer area 112.

A transport vehicle 114 that is a transport vehicle (transfer source vehicle) 2 travels within the first warehouse 111 and within the transfer area 112.

A transport vehicle 115 that is a transport vehicle (transfer destination vehicle) 2 travels within the second warehouse 113 and within the transfer area 112.

Hereinafter, the case where the rack is carried from the first warehouse 111 to the second warehouse 113 will be described.

The controller 1 notifies the transport vehicle 114 that the transport vehicle 114 should carry the rack to the transfer area 112 (FIG. 10(b)), as a transfer source instruction (S24). Along with this notification, the controller 1 may notify the transport vehicle 115 that the transport vehicle 115 should move to the vicinity of the transfer area 112.

As the controller 1 receives a response that the rack is unloaded from the transport vehicle 114 in the transfer area 112 (S13), the controller 1 instructs the transport vehicle 114 to leave the transfer area 112 (S25).

After waiting (S26) for the notification of the response (S13), the controller 1 instructs the transport vehicle 115 to go and take the rack unloaded, in the transfer area 112 (S27) (FIG. 10 (c)).

The controller 1 instructs the transport vehicle 115 lifting up the rack in the transfer area 112 to carry the rack to the second warehouse 113 (S28) (FIG. 10(d)).

Thus, a rack can be moved between difference warehouses.

Figure 11:
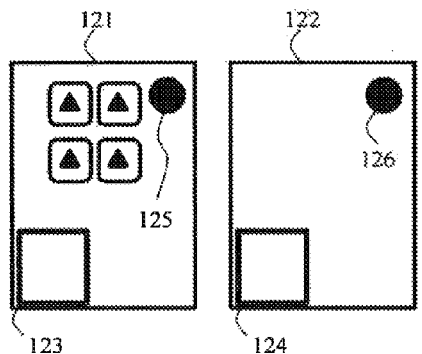
FIG. 11 is a plan view showing the way a rack is transferred between different floors, according to the one embodiment of the invention. Time passes in order of (a), (b), (c), (d), (e), and (f).
Figure 11:
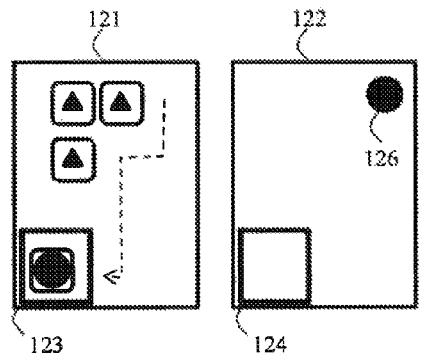
Figure 11:
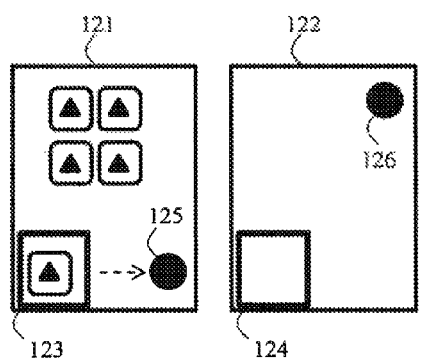
Figure 11:
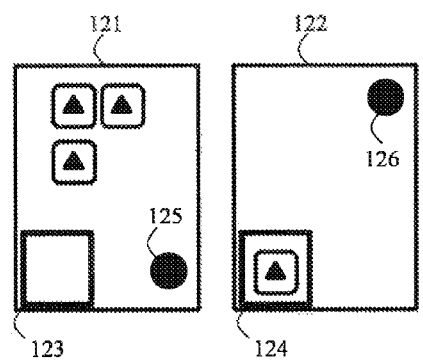
Figure 11:
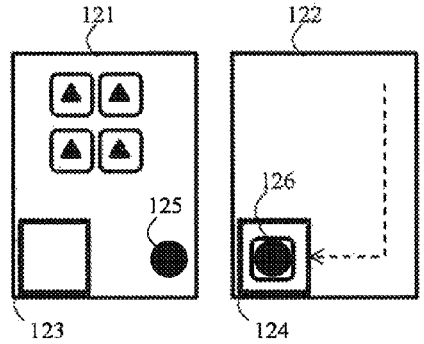
Figure 11:
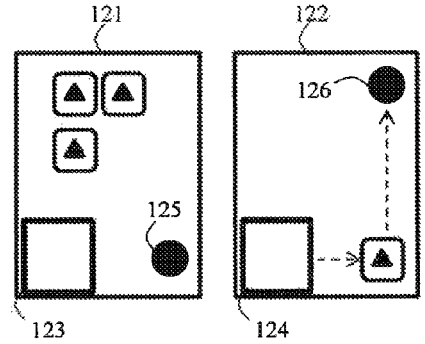

FIG. 11 is a plan view showing the way a rack is transferred between different floors. In FIG. 11(a), as in FIG. 10, the range in which one transport vehicle 2 can move is limited to a predetermined warehouse and a transfer area.

A transport vehicle 125 that is a transport vehicle (transfer source vehicle) 2 travels within a first warehouse 121 and within a transfer area 123.

A transport vehicle 126 that is a transport vehicle (transfer destination vehicle) 2 travels within a second warehouse 122 and within a transfer area 124.

Meanwhile, the difference from FIG. 10 is that the transfer areas 123, 124 for relaying between the warehouses are in separate places (in this example, the transfer area 123 is upstairs and the transfer area 124 is downstairs), and that the moving device 4 (forklift) is in charge of carrying the rack between the respective transfer areas 123, 124.

First, the transfer area setting unit 11 of the controller 1 acquires a list of the moving devices 4 (forklifts) connecting the first warehouse 121 and the second warehouse 122, with reference to the area information 16. From the acquired list, the transfer area setting unit 11 sets the transfer areas 123, 124 of the moving device 4 that is not operating at present or that will be available for operation at the earliest time.

The controller 1 notifies the transport vehicle 125 that the transport vehicle 125 should carry one of the racks within the first warehouse 121 to the transfer area 123 (FIG. 11(b), (c)), as a transfer source instruction (S24).

Figure 12:
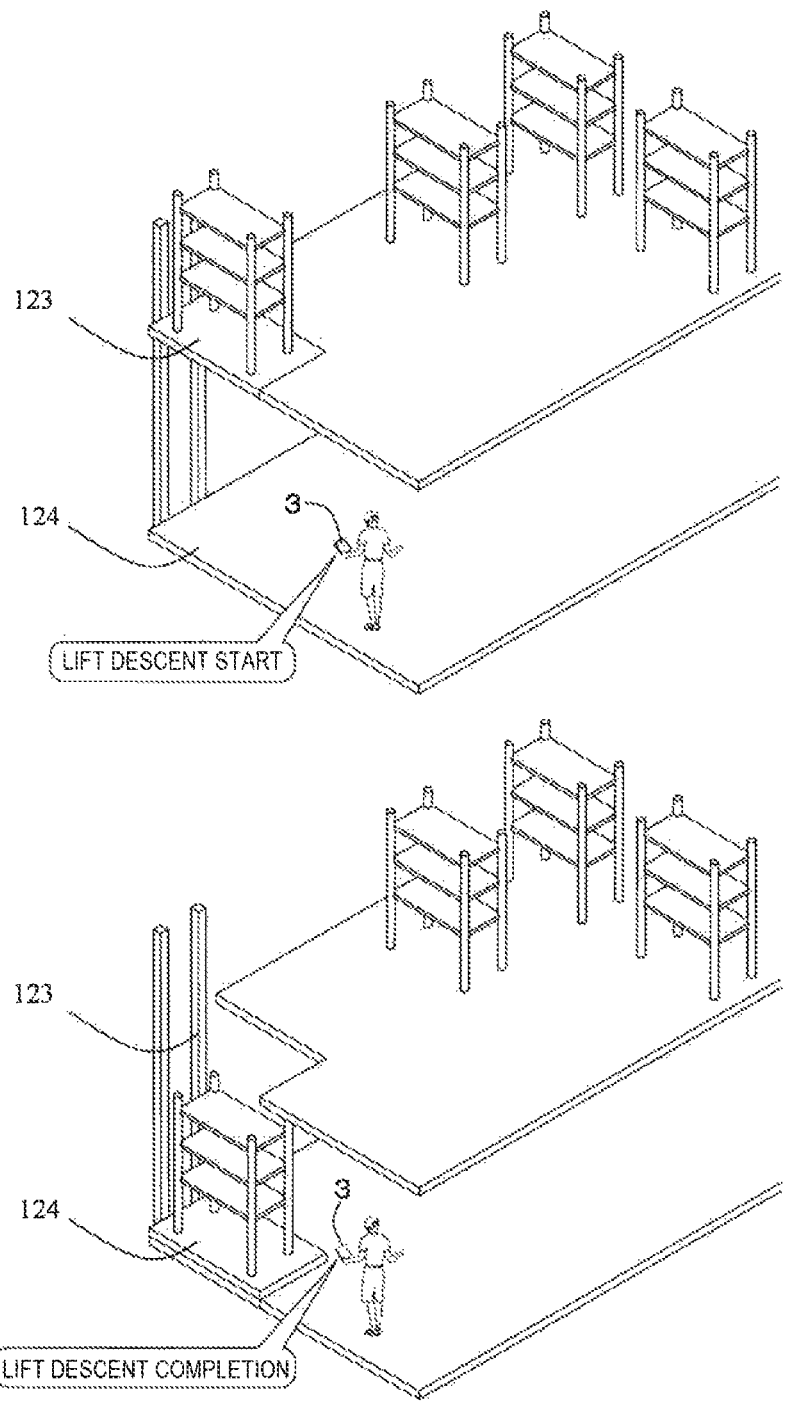
FIG. 12 is an elevation view showing a moving process between transfer areas by a moving device according to the one embodiment of the invention.

The operator confirms that the rack is put in the transfer area 123 and that there is no transport vehicle 2 under the rack, and then notifies the controller 1 of a descent start instruction for the moving device 4 (forklift) via the operator terminal 3 (FIG. 12(a)). The controller 1, having received the notification, gives a descent instruction to the moving device 4 and the rack thus moves from the upstairs transfer area 123 to the downstairs transfer area 124 (FIG. 11(d)). The operator gives a descent completion notification that the rack is moved downstairs (FIG. 12(b)), to the controller 1 via the operator terminal 3.

The controller 1 notifies the transport vehicle 126 that the transport vehicle 126 should carry the rack from the transfer area 124 into the second warehouse 122 (FIG. 11(e), (f)), as a transfer destination instruction (S27).

The controller 1, having received a response (S33) to the transfer destination instruction (S27), returns the moving device 4 (forklift) upstairs, which is the initial position.

Since the transport vehicles 2 can thus transfer a rack even between different floors via the moving device 4 (forklift), an application such as installing a rack with a low frequency of use upstairs or the like and taking the rack down according to need, can be employed. Therefore, the storage efficiency of racks per area can be improved and even a rack with a low frequency of use can be automatically carried by the transport vehicles 2. Moreover, even on the same floor, a rack can be efficiently transferred to carry out a task, by synchronizing operations via facilities.

Figure 13:
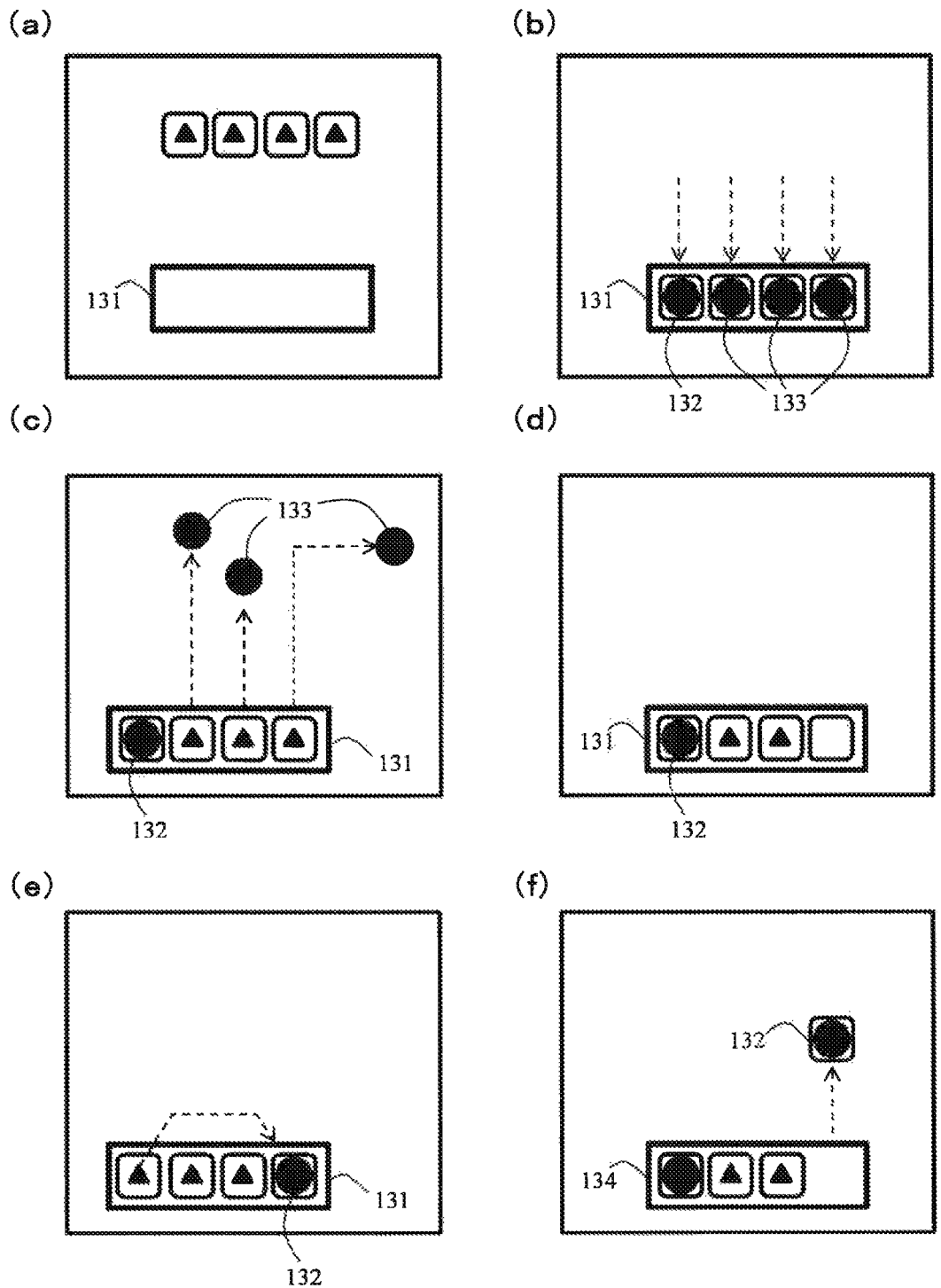
FIG. 13 is a plan view showing the way work is carried out in a transfer area according to the one embodiment of the invention. Time passes in order of (a), (b), (c), (d), (e), and (f).

FIG. 13 is a plan view showing the way work is carried out in a transfer area.

FIG. 13(a) shows a transfer area 131 where four racks can be put, and four racks.

The controller 1 gives, to four transport vehicles (transport vehicles 132, 133) that are transport vehicles (transfer source vehicles) 2, a transfer source instruction (S24) that the transport vehicles should carry one rack each to the transfer area 131 (FIG. 13(b)).

Moreover, the controller 1 sets the transport vehicle 132 as a transfer destination vehicle (S22) and causes the remaining three transport vehicles 133 to move out of the transfer area 131 and to other positions (FIG. 13(c)), as transfer source instruction after the transfer (S25).

Here, in the transfer area 131, the operator waits and carries out work such as picking from one of the four racks (in this case, the rack at the right end) (FIG. 13(d)). In the illustration of the rack after the work, a stored product indicated by a triangle in solid black is removed (picked).

After the completion of the work from the operator terminal 3 (S26), the controller 1 transmits an instruction to go and take the rack (S27), to the transport vehicle 132 (FIG. 13(e)). After that, the controller 1 transmits an instruction to take out the rack after the work from the transfer area 131 (S28), to the transport vehicle 132 (FIG. 13(f)).

Thus, racks can be transferred from a plurality of transport vehicles 133 to a single transport vehicle 132 and the number of transport vehicles 2 standing by for work can be reduced. Therefore, the operating rate of the transport vehicles 2 can be improved.

Figure 14:
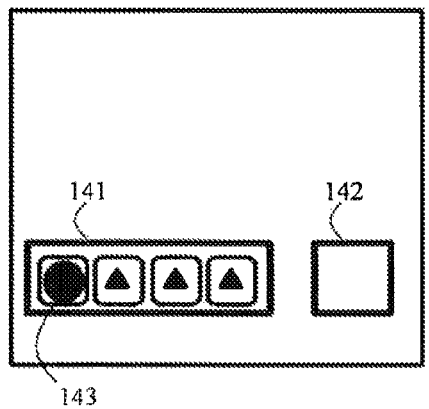
FIG. 14 is a plan view showing the way a rack is temporarily stored in an intermediate area to a transfer area, according to the one embodiment of the invention. Time passes in order of (a), (b), (c), (d), (e), and (f).
Figure 14:
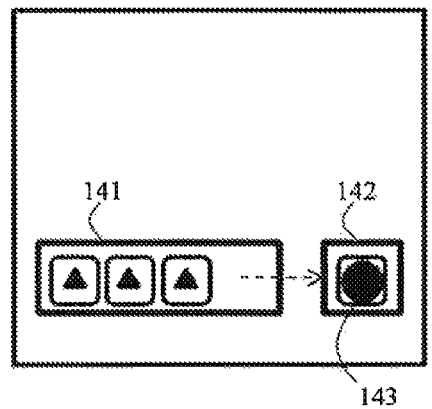
Figure 14:
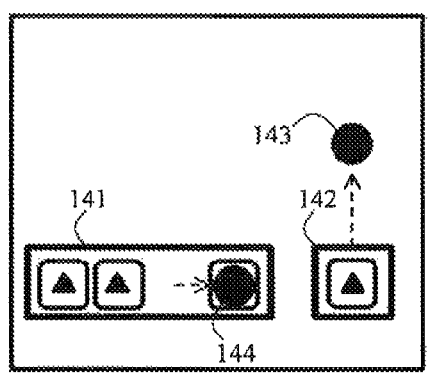
Figure 14:
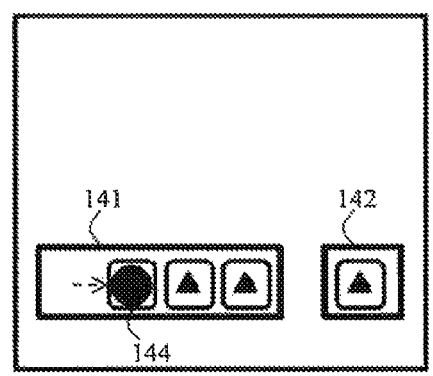
Figure 14:
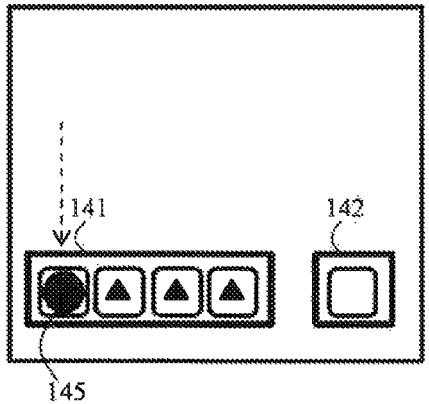
Figure 14:
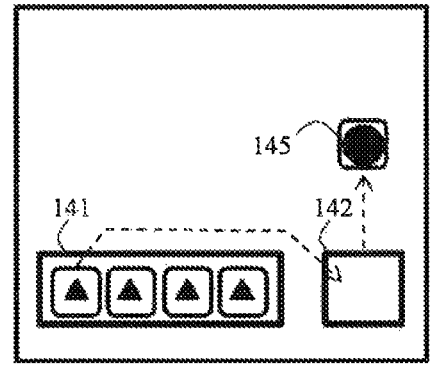

FIG. 14 is a plan view showing the way a rack is temporarily stored in an intermediate area to a transfer area.

FIG. 14(a) is similar to FIG. 13 in that a rack is taken to a transfer area 142 where the operator waits and that the rack is taken out of the transfer area 142 after the completion of work.

Meanwhile, in FIG. 14(a), an intermediate area 141 that is separate from the transfer area 142 is provided. Four racks can be put in the intermediate area 141. Then, transfer is carried out in two stages as follows.

A transfer source instruction that "a transport vehicle 145 should carry the rack before work, to an empty space in the intermediate area 141" (FIG. 14(e)), and a transfer destination instruction that "a transport vehicle 144 should array the racks closely to the right when a new empty space is generated in the intermediate area 141" (FIG. 14(c), (d)).

A transfer source instruction that "a transport vehicle 143 should carry the rack before work, from the right end of the intermediate area 141 to the transfer area 142, when the transfer area 142 is emptied" (FIG. 14(b)), and a transfer destination instruction that "the transport vehicle 145 should take out the rack from the transfer area 142 when the work on the rack in the transfer area 142 is complete" (FIG. 14(f)).

Thus, after transferring a plurality of racks, the transport vehicles 2 carry the racks according to the circumstance of the operator. Also, if a transferred rack is transferred again to another transport vehicle 2, the moving distance of the transport vehicle 2 can be reduced and the waiting time of the transport vehicle 2 due to the waiting for work by the operator can be reduced.

Figure 15:
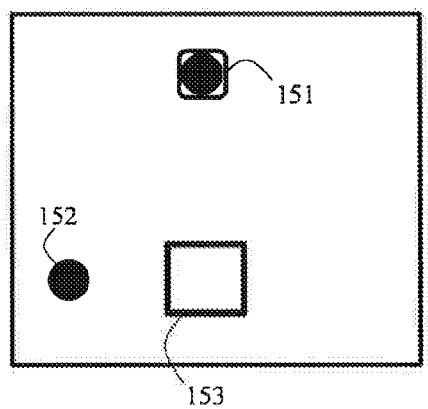
FIG. 15 is a plan view showing the way of transfer between transport vehicles through longitudinal movements and lateral movements, according to the one embodiment of the invention. Time passes in order of (a), (b), (c), (d), (e), and (f).
Figure 15:
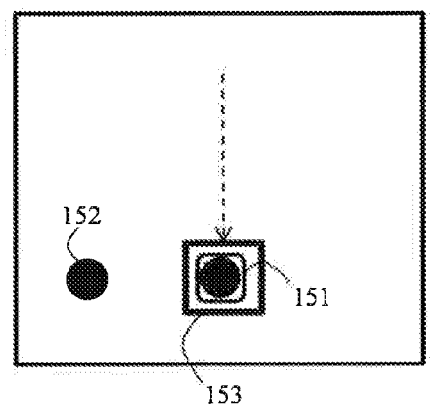
Figure 15:
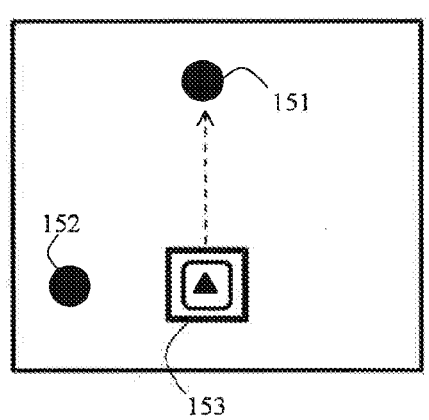
Figure 15:
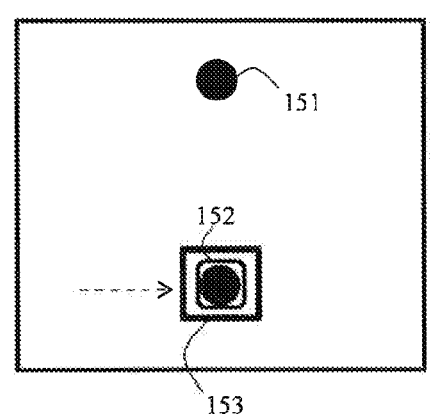
Figure 15:
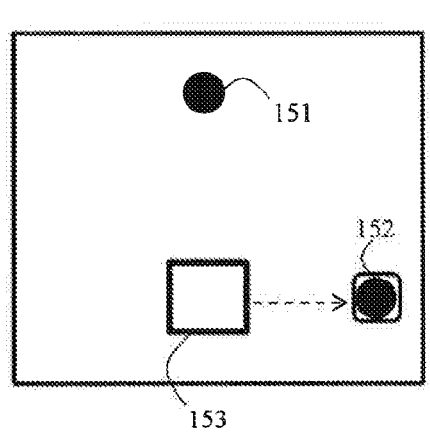
Figure 15:
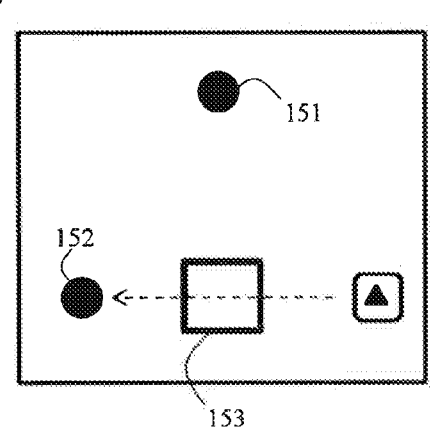

FIG. 15 is a plan view showing the way of transfer between transport vehicles through longitudinal movements and lateral movements.

A transport vehicle 151 is a vehicle that is movable only in longitudinal directions (up and down directions). A transport vehicle 152 is a vehicle that is movable only in lateral directions (left and right directions).

By thus limiting the operating structures of the transport vehicles 2 to simple linear movements, the cost of the transport vehicles 2 can be reduced.

The transfer area setting unit 11 of the controller 1 sets a point of intersection between an area where the transport vehicle 151 can move (hereinafter, longitudinal lines of movement) and an area where the transport vehicle 152 can move (hereinafter, lateral lines of movement), indicated by dashed lines in the illustration, as a transfer area 153.

Then, the controller 1 gives a transfer source instruction (S24) that the transport vehicle 151 now carrying the rack should move to the transfer area 153 and put the rack there (FIG. 15(a)-(c)).

Next, the controller 1 gives, to the transport vehicle 152 now standing by, a transfer destination instruction (S27) that the transport vehicle 152 should move from the transfer area 153 to a target area and put the rack (FIG. 15(d)-(f)).

Figure 16:
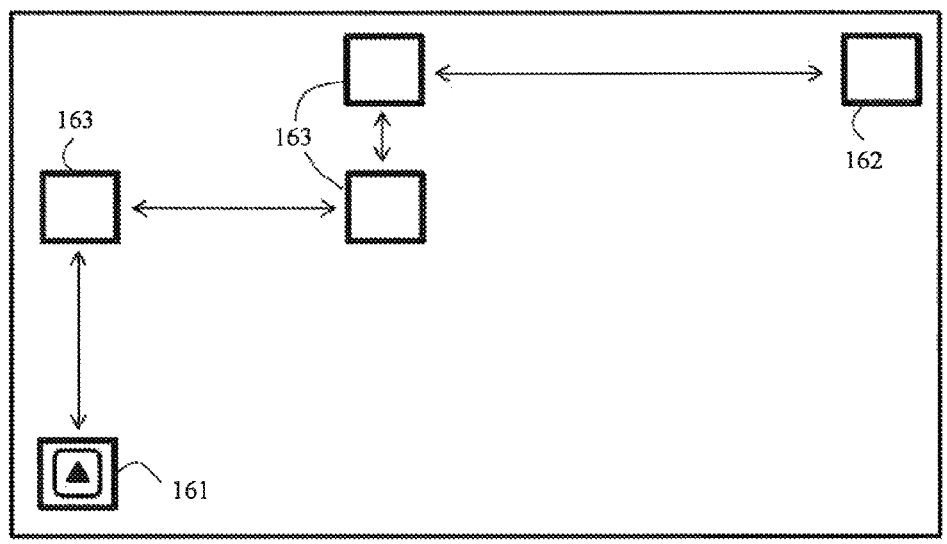
FIG. 16 is a plan view showing a route decision process using longitudinal movements and lateral movements, according to the one embodiment of the invention.
Figure 16:
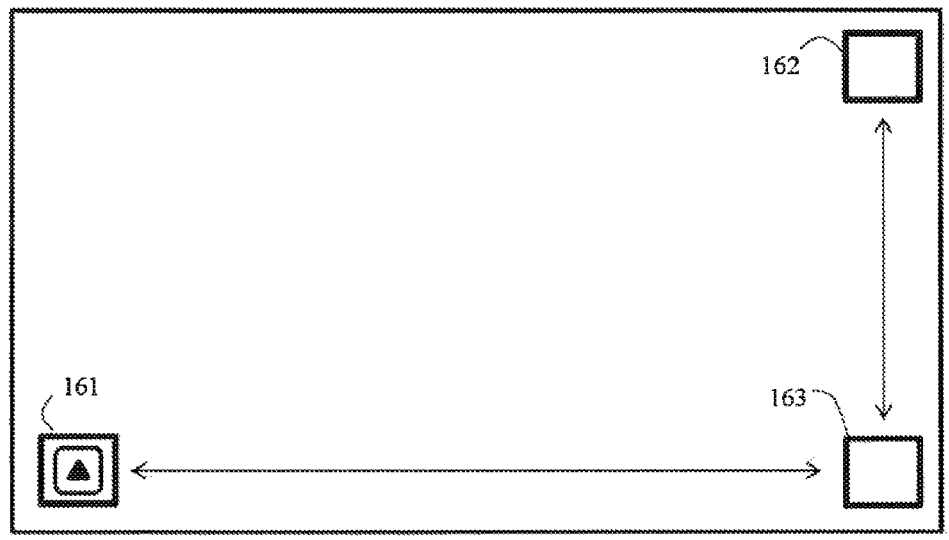

FIG. 16 is a plan view showing a route decision process using longitudinal movements and lateral movements in the configuration shown in FIG. 15.

Although FIG. 15 shows the case where transfer is made between two transport vehicles, transfer may be made between a plurality of transport vehicles that is three or more transport vehicles, so as to carry to the destination, as shown in FIG. 16.

The route searching unit 13 specifies a route that uses a minimum number of transport vehicles (number of transfer areas 163) combining longitudinally moving transport vehicles 2 and laterally moving transport vehicles 2 (hereinafter, specified route), of route candidates from the position of the transport vehicle (transfer source vehicle) 2 as the departure point to the target area as the destination.

For example, in FIG. 16(a), it takes three transfer areas 163 to reach the route to a destination 162 from a departure point 151. Meanwhile, in FIG. 16(b), it only takes one transfer area 163 to reach the route to the destination 162 from the departure point 161. Therefore, the specified route of FIG. 15(b) with the smaller number of transfer areas 163 is selected. Since the longitudinal or lateral movements can thus be set to long distances, the transport vehicles can move at high speeds.

The transfer area setting unit 11 sets each point of intersection between a longitudinal movement and a lateral movement on the specified route, as a transfer area.

The transfer vehicle setting unit 12 sets each transport vehicle 2 on the specified route that moves to each transfer area, as a transport vehicle (transfer destination vehicle) 2. Here, on a specified route configured as a first point of intersection→a second point of intersection→ . . . →a target area, for example, a predetermined transport vehicle 2 moving a rack from the first point of intersection to the second point of intersection plays the role of a transfer destination vehicle at the first point of intersection and plays the role of a transfer source vehicle at the second point of intersection.

The above-described embodiment is characterized in that after a transport vehicle (transfer source vehicle) 2 puts the rack that this transport vehicle 2 is carrying, a transport vehicle (transfer destination vehicle) 2 takes over the rack and continues to carry the rack. In this case, as the controller 1 forms transfer plans all together, such as where a transfer area should be arranged and which vehicle is used as the transport vehicle (transfer destination vehicle) 2, and gives instructions, efficiency carrying can be realized. Therefore, even in a circumstance where it is difficult for a single transport vehicle 2 to carry a rack to a target area, the occurrence of a delay in the carrying can be prevented.

It should be noted that the invention is not limited to the above examples and include various modifications. For example, the above examples are described in detail in order to explain the invention intelligibly and the invention should not necessarily limited to including all the configurations described above.

Also, a part of the configuration of one example can be replaced with the configuration of another example, and the configuration of one example can be added to the configuration of another example.

Moreover, with respect to a part of the configuration of each example, addition, deletion, and replacement with other configurations can be made. Also, a part or all of the respective configurations, functions, processing units and processing measures or the like described above may be realized with hardware, for example, by designing with an integrated circuit.

Also, the respective configurations and functions or the like described above may be realized with software, by a processor interpreting and executing a program that realizes each function.

Information of programs, tables, files or the like that realize each function can be stored in a recording device such as a memory, hard disk, or SSD (solid state drive), or a recording medium such as an IC (integrated circuit) card, SD card, or DVD (digital versatile disc).

Also, control lines and information lines that are considered necessary for explanation are shown, and not all the control lines and information lines are necessarily shown in terms of products. In practice, almost all the configurations may be considered to be interconnected.

REFERENCE SIGNS LIST 1 controller (transport management apparatus)
2 transport vehicle
3 operator terminal
4 moving device
11 transfer area setting unit
12 transfer vehicle setting unit
13 route searching unit
14 instruction unit
15 receiving unit
16 area information
17 transport vehicle information
21 instruction receiving unit
22 instruction execution unit
23 operation information acquisition unit
24 operation information determination unit
25 transmission unit
26 transport vehicle internal storage unit

The invention claimed is:
1. A transport management apparatus comprising:
a receiving unit which receives position information of respective transport vehicles transporting a transported object and stores the position information of the respective transport vehicles that is received, in a storage unit;

a transfer area setting unit which, when transferring the transported object from a transfer source vehicle of the respective transport vehicles to a transfer destination vehicle of the respective transport vehicles, decides a transfer area at a destination to which the transported object is transported by the transfer source vehicle;

a transfer vehicle setting unit which decides the transport vehicle that is the transfer destination vehicle on the basis of position information of the transfer area and the position information of the respective transport vehicles; and an instruction unit which instructs the transfer source vehicle to carry out a task of transporting the transported object to the transfer area, and instructs the transfer destination vehicle to carry out a task of transporting the transported object from the transfer area, wherein the receiving unit receives a notification of a fall in the apparatus's own remaining battery capacity from the transfer source vehicle, the transfer area setting unit searches for a charging station available for charging, and decides the transfer area on the basis of the position of a charging station that is found and the position of the transfer source vehicle, and the instruction unit instructs the transfer source vehicle to carry out a task of moving to the charging station that is found and starting charging, after the transfer source vehicle carries the transported object to the transfer area.

2. The transport management apparatus according to claim 1, further comprising:

a route searching unit which searches for a route on which the transfer area is a departure point or a destination, wherein the instruction unit includes the route found by the route searching unit, in a task to be communicated.

3. The transport management apparatus according to claim 2, wherein the respective transport vehicles are limited in respective movable directions thereof, the transfer area setting unit sets a point of intersection of line segments representing the movable directions of the respective transport vehicles, as the transfer area, and the transfer vehicle setting unit selects each of the respective transport vehicles passing the transfer area, as the transfer destination vehicle.

4. The transport management apparatus according to claim 3, wherein the route searching unit searches for a plurality of routes from a predetermined departure point to a predetermined destination, and the transfer area setting unit selects a route on which the number of the transfer areas is minimum, of a set of routes found by the route searching unit, and decides each of the transfer areas on the selected route.

5. The transport management apparatus according to claim 1, wherein the transfer area setting unit decides a passage between a first warehouse where the transfer source vehicle can move and a second warehouse, as the transfer area, the transfer vehicle setting unit decides the transfer destination vehicle from the transport vehicles movable within the second warehouse, and the instruction unit instructs the transfer destination vehicle to carry out a task of carrying the transported object from the transfer area into the second warehouse.

6. The transport management apparatus according to claim 1, wherein the transfer area in a first warehouse where the transfer source vehicle can move and the transfer area in a second warehouse where the transfer destination vehicle can move are configured in such a way that the transported object can be moved by a different moving measure from the transport vehicle, and the instruction unit receives a notification that the transported object is carried to the transfer area in the first warehouse by the transport source vehicle, and instructs the different moving measure to carry out a task of moving the transported object given in the notification, to the transfer area in the second warehouse.

7. The transport management apparatus according to claim 6, wherein the different moving measure is a forklift which connects the first warehouse into the second warehouse, and the task of moving the transported object between the transfer areas is a task of lifting up or lowering the transported object after loading the transported object on the forklift.

8. The transport management apparatus according to claim 1, wherein the transported object is a target of work by an operator, the instruction unit notifies the transfer source vehicle of a task of carrying the transported object to an empty space in an intermediate area, and notifies the transfer destination vehicle of a task of arraying the transported object in the intermediate area, and the instruction unit notifies the transfer source vehicle of a task of carrying the transported object from the intermediate area to the transfer area where work is carried out, and notifies the transfer destination vehicle of a task of carrying the transported object on which the work is done, out of the transfer area.

9. A transport management program for causing a computer to realize a function of each processing unit in the transport management apparatus according to claim 1.

10. A transport management apparatus comprising:

a receiving unit which receives position information of respective transport vehicles transporting a transported object and stores the position information of the respective transport vehicles that is received, in a storage unit, a transfer area setting unit which, when transferring the transported object from a transfer source vehicle of the respective transport vehicles to a transfer destination vehicle of the respective transport vehicles, decides a transfer area at a destination to which the transported object is transported by the transfer source vehicle, a transfer vehicle setting unit which decides the transport vehicle that is the transfer destination vehicle on the basis of position information of the transfer area and the position information of the respective transport vehicles, and an instruction unit which instructs the transfer source vehicle to carry out a task of transporting the transported object to the transfer area, and instructs the transfer destination vehicle to carry out a task of transporting the transported object from the transfer area, wherein the transported object is a target of work by an operator, and after a notification that work is done on the transported object carried to the transfer area, the instruction instructs the transfer destination vehicle to carry out a task of carrying the transported object on which the work is done, from the transfer area.

11. The transport management apparatus according to claim 10, wherein
the transfer vehicle setting unit selects the transfer destination vehicle from a plurality of the transfer source vehicles that carry the transported object to the transfer area.

12. A transport system comprising:
a transport management apparatus, the transport management apparatus comprising a receiving unit which receives position information of respective transport vehicles transporting a transported object and stores the position information of the respective transport vehicles that is received, in a storage unit, a transfer area setting unit which, when transferring the transported object from a transfer source vehicle of the respective transport vehicles to a transfer destination vehicle of the respective transport vehicles, decides a transfer area at a destination to which the transported object is transported by the transfer source vehicle, a transfer vehicle setting unit which decides the transport vehicle that is the transfer destination vehicle on the basis of position information of the transfer area and the position information of the respective transport vehicles, and an instruction unit which instructs the transfer source vehicle to carry out a task of transporting the transported object to the transfer area, and instructs the transfer destination vehicle to carry out a task of transporting the transported object from the transfer area, and
a transport vehicle, the transport vehicle including a detection unit, which detects whether an object exists in front of the apparatus itself or not,
wherein the detection unit invalidates a detection process while the transport vehicle on which the detection unit is installed is rotating.

* * * * *